Aug. 28, 1934.   P. BISCHOF   1,971,366
ADJUSTABLE AUTOMOBILE BRAKE CABLE CONNECTER
Filed Sept. 25, 1933
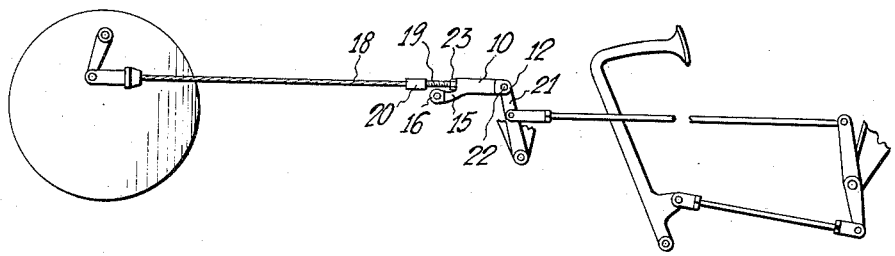
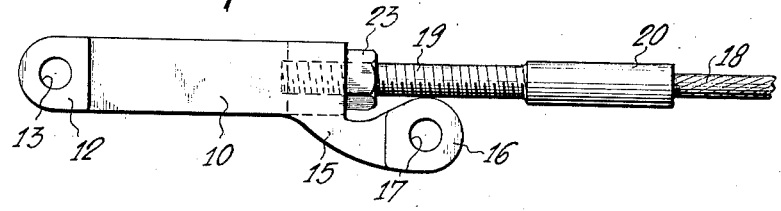
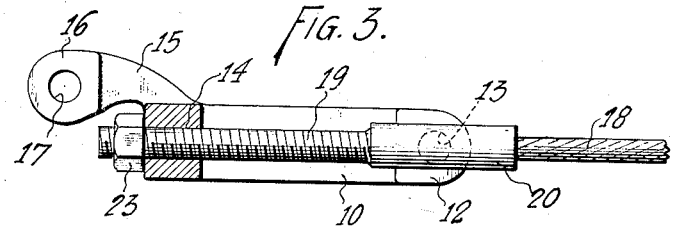
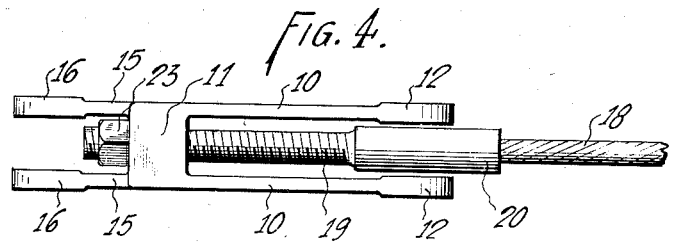
Inventor
Paul Bischof
By his Attorney J. Ledermann Patented Aug. 28, 1934

1,971,366

UNITED STATES PATENT OFFICE 1,971,366

ADJUSTABLE AUTOMOBILE BRAKE CABLE CONNECTER

Paul Bischof, New York, N. Y.

Application September 25, 1933, Serial No. 690,802

7 Claims. (Cl. 188—196)

One object of this invention is the provision of a novel means for shortening the effective length of stranded cables used on automobiles to join the brakes with the brake-actuating lever, so that the cable may be continued in use after it has been stretched the maximum amount which can be taken up on the usual take-up means.

Another object of the invention is the provision of a novel type of connecter adapted to be mounted between the brake cable end and a link of the brake actuating mechanism on new automobiles in the factory, the connecter being reversible after the cable has stretched so far as to be no longer operable, the reversing of the connecter shortening the effective length of the cable so that it may again be used for a long time, thus resulting in a practical doubling of the life of the cable.

The above and other objects will become apparent in the description below, in which characters of reference refer to like-named parts in the drawing.

Referring briefly to the drawing, Figure 1 is a schematic view of an automobile brake linkage, illustrating the application of this invention.

Figure 2 is an enlarged view of the connecter, showing it attached to the cable end.

Figure 3 is a similar view, showing the connecter in reversed position.

Figure 4 is a plan view of Figure 3.

Referring in detail to the drawing, the numeral 10 represents a pair of elongated arms having thickened ends 12 through which aligned holes 13 extend. These arms 10 are joined at the ends opposite the holes 13, by a square block 11 integral with the arms. A threaded channel 14 passes through this block. From the block 11, in a direction opposite to the arms 10, extend a pair of parallel, arcuate ears 15 having widened ends 16 through which aligned holes 17 pass, similar to the holes 13. This entire member, including the arms 10, block 11, and ears 15, is preferably formed of a single piece of material, such as, for instance, cast or wrought iron or steel.

Such cables usually terminate in an elongated threaded stem 19, joined to the cable 18 by means of a rigid union 20. In the original assembling of the brake mechanism at the factory, the member 10—11—15 is mounted as shown in Figures 1 and 2, with the brake mechanism link pivotally secured between the ends 12 of the arms 10 by means of a cotter-pin-secured pin 22. As the cable 18 stretches from continued use, its length may be reduced by screwing the stem 19 into the channel 14, and it is locked in the new position by the nut 23 (Figure 2). After the entire length of the stem 19 has been advanced through the channel 14, so that no further take-up is possible by the same operation, then the member 10—11—15 is detached from the crank 21 and unscrewed from the stem 19, and remounted in reverse position, as shown in Figures 3 and 4. The cable can then be again shortened, as continued use may require, by the entire length of the stem 19. It is thus apparent that the life of the cable, which usually terminates simply because it has stretched too far while it is still strong enough for continued service, is doubled by the use of this invention, which may also be substituted on cars already on the market.

Obviously, modifications in form and structure may be made without departing from the spirit of the invention.

I claim:

1. A cable connecter adapted to be mounted on the end of a cable, comprising a body having a threaded channel passing therethrough, a pair of relatively long spaced-apart arms extending from one side of said body, a pair of relatively short spaced-apart arms extending from the other side of said body in substantially the opposite direction, each of said pairs of arms being provided at their ends with aligned holes adapted to secure said arms pivotally to a crank or other means by passing a pin through said holes and said crank, the end of the cable having a threaded stem adapted to be screwed into said channel.

2. A brake cable connecter adapted to be mounted on the end of a cable having a threaded end to adjustably secure the threaded end of the cable to a link of the brake-actuating mechanism, comprising a body having a threaded channel passing therethrough adapted to receive said threaded cable end, an arm extending from each side of said body and having a hole at its end adapted to receive a pin for pivotally connecting the arm to said link, one of said arms being longer than the other, one of said arms being first pivotally secured to said link with said cable end passing through said channel in one direction, the other of said arms being then secured to said link with said cable end passing through said channel in the opposite direction to vary the effective take-up length of the cable.

3. A cable connecter comprising an elongated member having a hole at each end adapted to be mounted on the end of a cable having a threaded end to attach the threaded end of said cable to a link of the automobile brake mechanism, either end of said member being pivotally mountable on said link by passing a pin through the hole at that end and through said link, and a block rigid on said member at a point offset from the midpoint thereof, said block having a threaded channel passing therethrough adapted to receive said threaded cable end in either direction, the point of contact between said block and said cable end being at a lesser distance from said link when the member is attached to said link with the offset block nearer said link end than the opposite end of the member, said point of contact being at a greater distance from said link when the opposite end of said member is attached to said link.

4. A brake cable connecter adapted to be mounted on the end of a cable having a threaded end to adjustably secure the threaded end of the cable to a link of the brake-actuating mechanism in an automobile, comprising a body having a threaded channel passing therethrough, a pair of spaced-apart arms extending from one side of said body and having aligned holes in their extremities, a pair of spaced-apart arcuate arms extending from the opposite side of said block and having a similar pair of aligned holes in their extremities, said arcuate arms being shorter than said first-named arms and having its said holes offset from a line drawn through the center of said channel and the axis of said aligned holes in the longer arms, said channel being adapted to receive the threaded end of the cable therethrough in either direction, said pairs of aligned holes being adapted to receive a pin therethrough to attach either end of the connecter to said link.

5. A cable connecter adapted to be mounted on the end of a cable, comprising a body having a threaded channel passing therethrough, a pair of relatively long spaced-apart mutually parallel arms extending from one side of said body, a pair of relatively short spaced-apart mutually parallel arms extending from the other side of said body in substantially the opposite direction, each of said pairs of arms being provided at their ends with aligned holes adapted to secure said arms pivotally to a crank or other means by passing a pin through said holes and said crank, the end of the cable having a threaded stem adapted to be screwed into said channel.

6. A cable connecter adapted to be mounted on the end of a cable, comprising a body having a threaded channel passing therethrough, a pair of relatively long spaced-apart arms extending from one side of said body, a pair of relatively short spaced-apart arms extending from the other side of said body, each of said pairs of arms being provided at their ends with aligned holes adapted to secure said arms pivotally to a crank or other means by passing a pin through said holes and said crank, the end of the cable having a threaded stem adapted to be screwed into said channel.

7. A cable connecter adapted to be mounted on the end of a cable, comprising a body having a threaded channel passing therethrough, a pair of relatively long spaced-apart arms extending from said body, a pair of relatively short spaced-apart arms extending from said body, each of said pairs of arms being provided at their ends with aligned holes adapted to secure said arms pivotally to a crank or other means by passing a pin through said holes and said crank, the end of the cable having a threaded stem adapted to be screwed into said channel.

PAUL BISCHOF.